(No Model.)
I. STEAD.
DRY AMALGAMATOR.
No. 273,775. Patented Mar. 13, 1883.
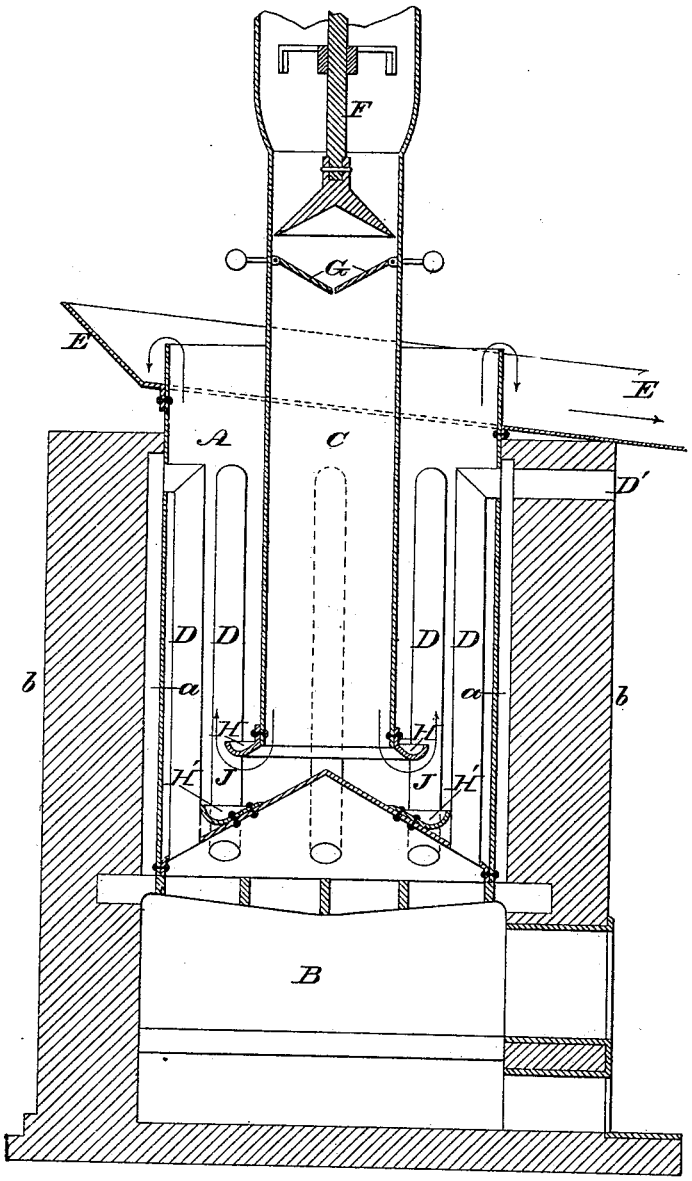
WITNESSES:
L. Douville
W. F. Kircher
INVENTOR:
Isaac Stead,
BY John A. Wiedersheim
ATTORNEY.

UNITED STATES PATENT OFFICE.

ISAAC STEAD, OF PHILADELPHIA, PENNSYLVANIA.

DRY AMALGAMATOR.

SPECIFICATION forming part of Letters Patent No. 273,775, dated March 13, 1883.

Application filed June 24, 1882. (No model.)

*To all whom it may concern:*

Be it known that I, ISAAC STEAD, a citizen of the United States, residing in the city and county of Philadelphia, State of Pennsylvania, have invented a new and useful Improvement in Dry Amalgamators, which improvement is fully set forth in the following specification and accompanying drawing, in which the figure is a vertical section of apparatus embodying my invention.

This invention consists of certain improvements in means for extracting metal from their ores, the ore, in a powdered condition, being introduced under pressure into a lead bath, and the latter maintained at a high temperature, as will be hereinafter fully set forth.

Referring to the drawing, A represents a pot or chamber open at top, and B a furnace for heating the same, both being properly supported.

C represents a feed-pipe which depends within the pot A, and is sustained by suitable means, said pipe having its lower end sufficiently separated from the bottom of the pot, so as to allow a passage between them for the flow of ore from the pipe into said pot.

Within the pot is fitted a series of flues, D, whose lower ends are connected with the bottom of the pot and communicate with the combustion-chamber of the furnace, and the upper ends are connected with the side wall of the pot and open into the space *a*, between the pot and surrounding wall or masonry *b*.

The products of combustion are carried off by means of a flue, D', which passes through the wall *b* and communicates with the space *a*, said products entering said space from below, and likewise through the flues D.

E represents a chute which surrounds the top of the pot and extends therefrom to an endless apron or other conveyer for purposes to be hereinafter explained.

Within the feed-pipe is fitted a plunger, F, to which vertical motions are imparted by means of a crank-shaft, vibrating beam, or other suitable device, said plunger being properly guided and sustained in position. If desired, two or more plungers may be employed in the same feed-pipe, or in different feed-pipes, and they may be operated alternately or in harmony without departing from my invention.

The feed-pipe is also provided with valves G, which occupy a position below the head of the plunger, said valves being pivotally connected with the pipe opening downward, and weighted so as to close automatically, the closing motion being upwardly. If desired, a sliding valve may be employed in lieu of the pivoted or hinged valves, the same passing through the wall of the pipe and operated by suitable arms, levers, &c., connected with the mechanism or machinery which operates the plunger.

To the bottom of the feed-pipe is secured a shoe, H, and to the upper side of the bottom of the pot is secured a shoe, H', the two shoes being of dishing or depressed shape, so as to form a deflector, J, in the passage between the feed-pipe and bottom of the pot for guiding the ore upwardly after it leaves the bottom of said feed-pipe.

The operation is as follows: Lead is placed in the pot A and melted by the heat from the furnace, and the hopper or inlet end of the feed-pipe is supplied with powdered ore. As the plunger F rises the ore falls and opens the valves G, the plunger descends and forces the ore to the bottom of the feed-pipe, the valve G then closing. Fresh charges of ore are supplied to the feed-pipe under pressure of the plunger, the plunger rising and falling alternately with the opening and closing motions of the valves. As the ore leaves the feed-pipe under pressure it enters the molten lead, and is directed upward by the action of the deflector J, and ascending through the lead or bath overflows at the top of the pot and is caught by the chute E, which, being inclined, directs the ore to an endless apron or other device, whereby it may be collected elsewhere, or conveyed to a place for further treatment.

As it is essential to maintain the molten lead or lead bath at a high temperature, it will be seen that I provide for the same by means of heat applied to the pot at the bottom and side thereof and directly through the body of the lead through the flues D, the combined action of the several heating-surfaces subjecting the lead to intense heat, as is evident.

In practice the ore is primarily heated, so as to further increase the effectiveness of the lead bath.

Having thus described my invention, what

I claim as new, and desire to secure by Letters Patent, is—

1. The feed-pipe C, provided with shoe H, attached to the bottom thereof, in combination with the pot A, having shoe H' attached to the same below shoe H, the two shoes combining to form an upward deflector, substantially as set forth.

2. A pot for molten lead, provided with the shoe H', and a furnace for heating said pot, in combination with the feed-pipe C, having shoe H attached to the bottom thereof, said pipe being provided with a plunger, F, for forcing the ore to the bottom of the feed-pipe, and valves G, connected to the pipe below said plunger, substantially as and for the purposes set forth.

ISAAC STEAD.

Witnesses:
JOHN A. WIEDERSHEIM,
A. P. GRANT.